(12) United States Patent
Schweitzer et al.

(10) Patent No.: US 12,345,723 B2
(45) Date of Patent: Jul. 1, 2025

(54) METHOD OF OPERATING AN AUTOMATIC ANALYSIS APPARATUS AND AUTOMATIC ANALYSIS APPARATUS

(71) Applicant: Endress+Hauser Conducta GmbH+Co. KG, Gerlingen (DE)

(72) Inventors: Daniel Schweitzer, Remshalden (DE); Ulrich Kathe, Ludwigsburg (DE); Ulrich Rottensteiner, Stuttgart (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 771 days.

(21) Appl. No.: 16/921,574

(22) Filed: Jul. 6, 2020

(65) Prior Publication Data

US 2021/0003601 A1    Jan. 7, 2021

(30) Foreign Application Priority Data

Jul. 4, 2019    (DE) .................... 10 2019 118 171.2

(51) Int. Cl.
*G01N 35/00*    (2006.01)

(52) U.S. Cl.
CPC ...    *G01N 35/0092* (2013.01); *G01N 35/00613* (2013.01); *G01N 2035/0097* (2013.01)

(58) Field of Classification Search
CPC ......... G01N 35/0092; G01N 35/00613; G01N 2035/0097
See application file for complete search history.

(56) References Cited

U.S. PATENT DOCUMENTS

| | | | | |
|---|---|---|---|---|
| 4,585,007 A | * | 4/1986 | Uchigaki | A61M 1/3672 600/363 |
| 4,794,806 A | | 1/1989 | Nicoli et al. | |
| 5,569,838 A | | 10/1996 | Broedel et al. | |

(Continued)

FOREIGN PATENT DOCUMENTS

| | | |
|---|---|---|
| CN | 101185001 A | 5/2008 |
| CN | 101871859 A | 10/2010 |

(Continued)

*Primary Examiner* — Lina Cordero
*Assistant Examiner* — Lyudmila Zaykova-Feldman
(74) *Attorney, Agent, or Firm* — Christopher R. Powers; Endress+Hauser (USA) Holding, Inc.

(57) ABSTRACT

The present disclosure relates to a method of operating an automatic analysis apparatus for determining a parameter of a sample liquid which depends on the concentration of an analyte in the sample liquid on the basis of a first measurement variable detected by the analysis apparatus, wherein the analysis apparatus comprises an optical measuring transducer with a measurement unit, the method including: a) providing a reaction mixture comprising the sample liquid in the measurement unit; b) detecting a first measurement variable for determining the parameter; c) detecting a second measurement variable if step b) reveals that the concentration of the analyte in the reaction mixture is outside the measuring range of the analysis apparatus for detecting the first measurement variable; d) diluting the reaction mixture with dilution liquid as a function of the second measurement variable; and e) re-detecting the first measurement variable for determining the parameter.

8 Claims, 2 Drawing Sheets

(56) References Cited

U.S. PATENT DOCUMENTS

| | | | |
|---|---|---|---|
| 2002/0154299 A1* | 10/2002 | Robertson | G01N 21/645 356/246 |
| 2004/0191124 A1* | 9/2004 | Noetzel | G01N 33/721 422/69 |
| 2006/0238764 A1* | 10/2006 | Hafeman | G01N 21/314 356/319 |
| 2007/0036684 A1* | 2/2007 | Burkhardt | G01N 1/10 422/400 |
| 2007/0128618 A1* | 6/2007 | Chait | G01N 33/6803 435/7.1 |
| 2008/0166271 A1* | 7/2008 | Tung | G05D 11/138 422/106 |
| 2013/0293894 A1* | 11/2013 | Salerno | G01N 21/0303 356/432 |
| 2016/0084807 A1* | 3/2016 | Srinivasan | G01N 30/8675 73/1.02 |
| 2016/0363569 A1* | 12/2016 | Walsh | G01N 33/2835 |
| 2017/0259234 A1* | 9/2017 | Hayashi | B01F 35/831 |
| 2018/0259543 A1* | 9/2018 | Gan | G01N 33/72 |
| 2020/0182756 A1* | 6/2020 | Kathe | G01N 35/02 |
| 2021/0063417 A1* | 3/2021 | Okamoto | G01N 33/721 |
| 2022/0252503 A1* | 8/2022 | Gibbons | C12Q 1/689 |
| 2023/0221250 A1* | 7/2023 | Ehring | G01N 21/314 356/432 |

FOREIGN PATENT DOCUMENTS

| | | |
|---|---|---|
| CN | 103091152 A | 5/2013 |
| CN | 110609139 A | 12/2019 |
| DE | 4030516 A1 | 4/1992 |
| DE | 4407345 A1 | 9/1995 |
| DE | 10305050 A1 | 8/2004 |
| DE | 69828799 T2 | 1/2006 |
| DE | 102009009583 A1 | 8/2010 |
| DE | 102010028756 A1 | 11/2011 |
| DE | 102014012367 B3 | 8/2015 |
| JP | 56108957 A | 8/1981 |
| JP | 57173741 A | 10/1982 |
| JP | 6459156 A | 3/1989 |
| JP | 0470564 A | 3/1992 |
| JP | 7167756 A | 7/1995 |
| JP | 2000146942 A | 5/2000 |
| JP | 2008232747 A | 10/2008 |
| JP | 2009008510 A | 1/2009 |
| JP | 2017020956 A | 1/2017 |
| JP | 2017111125 A | 6/2017 |

* cited by examiner

METHOD OF OPERATING AN AUTOMATIC ANALYSIS APPARATUS AND AUTOMATIC ANALYSIS APPARATUS

CROSS-REFERENCE TO RELATED APPLICATION

The present application is related to and claims the priority benefit of German Patent Application No. 10 2019 118 171.2, filed on Jul. 4, 2019, the entire contents of which are incorporated herein by reference.

TECHNICAL FIELD

The present disclosure relates to a method of operating an automatic analysis apparatus and to an analysis apparatus.

BACKGROUND

In photometric analyzers, the concentration of a substance in a solution can be determined. This substance must have wavelength-dependent absorption properties or acquire such absorption properties after chemical reactions with one or more reagents. When a solution of such a substance is irradiated with light, the absorption (extinction) $E_\lambda$ is a function of the decadic extinction coefficient $\varepsilon_\lambda$ (often also referred to as the spectral absorption coefficient), the concentration c and the path length (length of the light path in the solution) d. This law is described by the Lambert-Beer law. With this methodology, the concentration of numerous substances can be determined. This methodology is described in numerous standards and analysis regulations.

$$E_\lambda = \varepsilon_\lambda \cdot c \cdot d$$

$E_\lambda$: Absorption (extinction)
$\varepsilon_\lambda$: Decadic extinction coefficient (or spectral absorption coefficient)
c: Concentration
d: Path length The extinction can be determined from the intensity of the incident (irradiated) light (unit: $W \cdot m^{-2}$) and the intensity of the transmitted light (unit: $W \cdot m^{-2}$). An extinction or transmission and ultimately the concentration of the analyte can thus also be determined by determining such intensities.

The possible measuring range of an optical measuring transducer, in particular of a photometric system, is limited. This results in a measuring range beginning and a measuring range end. The measurement ratio can be calculated from the quotient of these two values. The optimum measuring range is usually between 20% and 80% of the photometer measuring range.

When concentrations above the measuring range end have to be measured, common methods are either the shortening of the path length or the dilution of the sample prior to the analysis. However, both methods have systematic disadvantages.

When the path length is shortened, the entire measuring range shifts (the measuring range beginning and measuring range end are increased), but the measurement ratio does not. Shortening the path length consequently increases the measuring range beginning, as a result of which solutions with low concentration can no longer be analyzed with sufficient accuracy. Moreover, constructive limits for shortening the measurement unit, for example a measuring cell or the cuvette, are often set in process analysis. Cuvettes that are too narrow are unfavorable in terms of flow technology; air bubbles or particles can settle and lead to measurement disturbances, for example. For constructive and economic reasons, it is often also undesirable to offer various path lengths.

Known prior art is to dilute the sample in the case of too high concentrations prior to the measurement. In this method, the sample is generally mixed with a dilution medium at a specific ratio in an additional vessel prior to the measurement. The diluted solution is subsequently measured.

Since the dilution ratio can be varied within a very wide range, the measurement ratio can thereby be increased. However, the expected measured value must be approximately known in order to determine the correct dilution ratio, so that the measured value of the diluted sample is in the optimum measuring range.

However, in many measurement tasks, the sample concentration is unknown, as a result of which the necessary dilution ratio is not known and can only be determined by time-consuming series of experiments. If a false dilution ratio is chosen, the measured concentration after the dilution is not in the optimum measuring range. The dilution ratio must thus be changed and the measurement repeated. This also requires a very large sample. Depending on the application, it may be problematic to obtain sufficient sample for several dilution iterations.

SUMMARY

The object of the present disclosure is therefore to specify a method and an analysis apparatus for determining a parameter, which depends on the concentration of at least one analyte in the sample liquid, which method and analysis apparatus enables an increase in the measurement ratio, preferably without simultaneously increasing the measuring range beginning.

The object is achieved by a method and an automatic analysis apparatus according to the present disclosure. Advantageous embodiments are further disclosed.

The method according to the present disclosure is used to operate an automatic analysis apparatus for determining a parameter of a sample liquid which depends on the concentration of at least one analyte in the sample liquid on the basis of a first measurement variable detected by the analysis apparatus.

The analysis apparatus comprises an optical measuring transducer in a measurement unit. The measurement unit can comprise a measuring cell, for example in the form of a flow cell, or a cuvette.

The method according to the present disclosure is characterized by the following steps:

Step a): providing a reaction mixture comprising the sample liquid in the measurement unit. The reaction mixture furthermore comprises a reagent coloring in combination with the analyte.

In this case, a sample solution can first be introduced into the optical measurement unit and a reagent, in particular a reagent coloring in combination with the analyte, can then be added.

A volume in which the concentration of an analyte is to be determined is to be understood as introduced sample liquid. Before this introduction of the sample liquid, the measurement unit can be flushed with a first volume of sample liquid in preparatory steps, wherein the introduced sample liquid of step a) in this case is the second volume of sample liquid.

After the color development, the reaction mixture is analyzed for the first time. The reagent can also already be supplied in advance in a mixing station upstream of the measurement unit or can preferably be conducted directly into the optical measurement unit. The sample solution can be introduced first and the reagent added, or vice versa.

Step b) detecting a first measurement variable for determining the parameter;

After the reaction mixture is produced and the reaction products are formed, a first measurement variable is detected for determining the concentration of the introduced sample solution or in the reaction mixture produced therefrom. In the case of an optical measuring transducer, in particular a photometer or spectrophotometer, the measurement variable can be determined, for example, as extinction (according to the Lambert-Beer law) in order to determine the concentration with a known extinction coefficient and with a known path length. Detection of the first measurement variable can also mean that the detected measurement variable is not quantifiable, but only an error message is output, according to which this first measurement variable (for example, the extinction) is too high or is outside the optimum measuring range.

If the measured measurement variable is in the optimum measuring range, this first measurement variable allows the concentration of the analyte in the sample solution to be determined. In this case, the measuring method would be terminated at this point, and a measuring and control unit can now carry out a calculation of the corresponding parameter.

If the extinction is too high and outside the optimum measuring range, the current prior art would require the measurement and the mixture to be discarded, a dilution ratio to be selected, the sample liquid to be diluted with a suitable dilution ratio prior to the analysis and the analysis to be repeated with the diluted sample liquid. Where applicable, several experiments are necessary until a suitable dilution ratio is found at which the extinction after the analysis is in the optimum range.

This method leads to a long analysis duration, as a result of which results are not available promptly. At the same time, the consumption of dilution solution and reagent increases, for example, by re-flushing, dilution series and analysis repetitions and the like.

With the method improvement presented here, the measurement variable is determined according to the following method:

Step c) detecting a second measurement variable if step b) reveals that the concentration of the analyte in the sample liquid or in the reaction mixture is outside the measuring range of the analysis apparatus;

If the measuring transducer recognizes, for example, on the basis of an extinction value, that the concentration of the sample solution is too high, the measurement variable is outside an optimum range. In this case, a second measurement variable is recorded. This may be the same measurement variable as in step b), but is fraught with greater uncertainties, since the measured value is outside the optimum range, or it may be another quantifiable physical variable. The detection of the second measurement variable can be carried out with great measuring uncertainty, since the dilution range and not a specific measured value is to be determined with this measurement variable. For this purpose, the optical density of the sample solution is suitable as a second measurement variable.

Step d) diluting the reaction mixture with dilution liquid as a function of the second measurement variable;

The sample solution is diluted as a subsequent step.

Step e) re-detecting the first measurement variable for determining the parameter.

Re-detecting then takes place within the range of the optical measuring transducer, in which an evaluation of the detected measured value is possible.

In a second variant of the method, the following sequence of steps takes place:

Step c) adding a predefined volume of dilution liquid if step b) reveals that the concentration of the analyte in the sample liquid or in the reaction mixture produced therefrom is outside the measuring range of the analysis apparatus for detecting the first measurement variable;

If a second measurement variable was determined in step c), the necessary addition of dilution liquid can be calculated.

If a second measurement variable could not be determined, the dilution is carried out by adding a predefined volume (for example, 50 ml). In this case, however, the dilution may still not be sufficient.

Step d) re-detecting the first measurement variable for determining the parameter; and repeating step c) if the detection after step d) reveals that the concentration of the analyte in the diluted sample liquid or in the diluted reaction mixture is outside the measuring range of the analysis apparatus for detecting the first measurement variable.

The addition of the dilution volume and the subsequent detection are thus repeated until an evaluable dilution ratio is reached, which allows the first measurement variable to be detected and evaluated.

Both variants are based on an optimization of the dilution ratio of a sample solution within a measurement unit, thus within a measuring cell or cuvette, without the latter having to be emptied.

The underlying idea is to dilute the solution to be analyzed only after the analysis, instead of before the analysis, as soon as the absorption exceeds the optimum measuring range of the apparatus.

This method saves measuring time and minimizes the consumption of dilution solution. Overall, the measurement ratio of the analysis apparatus can be increased by the two aforementioned alternatives of a method according to the present disclosure.

The measurement ratio is defined as follows $$V = \frac{MBE}{MBA}$$

MBE: Measuring range end

MBA: Measuring range beginning

Other advantageous embodiments are the subject matter of the dependent claims.

It is advantageous if the first measurement variable comprises the extinction, transmission or intensity of light transmitted through the reaction mixture.

The analysis apparatus can have a dilution unit and a measuring and control electronics, wherein the determination of the second measurement variable is carried out by the measuring transducer. The dilution can be carried out by the dilution unit, wherein the measuring and control electronics determines a dilution factor as a function of the detected second measurement variable. A corresponding dilution unit is controlled by a measuring and control electronics as a function of the dilution factor.

The volume of dilution liquid supplied in step c) can be determined by a measurement by means of a measuring device or by specifying a defined metered volume. The defined metered volume can be, for example, the filling volume of a dilution unit.

When determining the concentration of analyte in the sample liquid, the volume of dilution liquid supplied in step c) must be taken into account.

This can take place as follows:

$$A_{log} = e^{-\frac{V_{dilution}}{V_{cuvette}}}$$

$$A_{lin} = \frac{V_{(dilution)}}{V_{(dilution)} + V_{cuvette}}$$

A: Dilution ratio
$V_{dilution}$: Added dilution volume
$V_{cuvette}$: Cuvette volume Due to the fact that the cuvette form is known, the correct dilution formula can be selected.

The starting concentration of analyte is thus:

$$c_{Original} = \frac{1}{A} * c_{after\ dilution}$$

A: Dilution ratio
$c_{Original}$: Calculated concentration
$c_{after\ dilution}$: Measured concentration after adding the dilution solution In addition to the aforementioned steps, the method can also comprise the following steps:
flushing at least the measurement unit of the analysis apparatus with a first volume of the sample
introducing the sample liquid into the measurement unit according to step a) using a second volume of sample liquid;
liquid;
discharging the first volume of the sample liquid used to flush the measurement unit into a collection container containing a waste liquid mixture;
producing a reaction mixture from at least a portion of the sample liquid and at least one reagent;
detecting a measured value according to step b) to determine a first measurement variable of the reaction mixture in the measurement unit, such measurement variable correlating with the parameter of the sample liquid that is to be determined; and
carrying out steps c)-e) of the first variant of the present disclosure or c) and d) of the second variant of the present disclosure.
after detecting the measured value, discharging the reaction mixture from the measurement unit into the collection container;

The measurement unit can be flushed with a portion of the diluted sample liquid after the flushing with the first volume of the sample liquid and before the detection of the measured value of the measurement variable of the reaction mixture that correlates with the parameter of the sample liquid that is to be determined.

Recovering the dilution liquid from the waste liquid mixture may include a membrane method in which the dilution liquid, in particular water, is separated from the waste liquid mixture.

Recovering the dilution liquid from the waste liquid mixture may, for example, include condensing vapor obtained from the waste liquid mixture. The dilution liquid must be free of the at least one analyte.

Recovering the dilution liquid from the waste liquid mixture may include distillation or fractionated distillation of at least a portion of the waste liquid mixture.

Furthermore, according to the present disclosure, there is an automatic analysis apparatus for determining measured values of a parameter dependent on the concentration of at least one analyte in a sample liquid, wherein the analysis apparatus has an optical measuring transducer in a measurement unit and additionally comprises the following:
a sample liquid line that can be fluidically connected with a sampling point containing the sample liquid;
a dilution unit that can be fluidically connected with the measurement unit and a supply line for dilution liquid, and that is designed to dilute a reaction mixture located in the measurement unit with the dilution liquid;
at least one liquid container containing a reagent;
means for transporting the sample liquid and the reagent to the measurement unit, and for producing a reaction mixture from the sample liquid and the reagent, wherein the measurement unit is designed to generate a measurement signal representing a first measurement variable and/or second measurement variable of the reaction mixture, such measurement variable correlating with the parameter to be determined.

According to the present disclosure, the analysis apparatus has a measuring and control unit which is designed to carry out the aforementioned method according to the present disclosure.

Particularly preferably, the analysis apparatus can additionally
have a collection container arranged downstream of the measurement unit and containing a waste liquid mixture; and
a separating device which is fluidically connected with the collection container and which is equipped to recover a dilution liquid from the waste liquid mixture contained in the collection container, wherein the separating device can be fluidically connected with the dilution unit in order to supply dilution liquid to the dilution unit.

The measurement unit can advantageously have a measuring cell or a measuring cuvette, wherein the volume of the measuring cell or measuring cuvette is matched to the method according to the present disclosure. In the case of a closed measuring cell or measuring cuvette, it is provided that an additional volume is provided, since the volume of liquid increases when additional dilution solution is fed into the sample solution.

The measurement unit can also have a measuring cell or a measuring cuvette, wherein the measuring cell or measuring cuvette has an open drain for specifying a maximum liquid level. The open drain is to be understood as an overflow.

The measuring cell or measuring cuvette can advantageously additionally or alternatively also have an overflow weir for specifying a maximum liquid level.

In order to homogenize the sample solution when feeding the dilution solution, a part of a stirrer, preferably a stirring element, in particular a stirring element of a magnetic stirrer, can be arranged in the measuring cell or measuring cuvette.

BRIEF DESCRIPTION OF THE DRAWINGS

The present disclosure is described in more detail in the following with reference to the exemplary embodiments illustrated in the figures. The following are shown.

DETAILED DESCRIPTION

Figure 1:
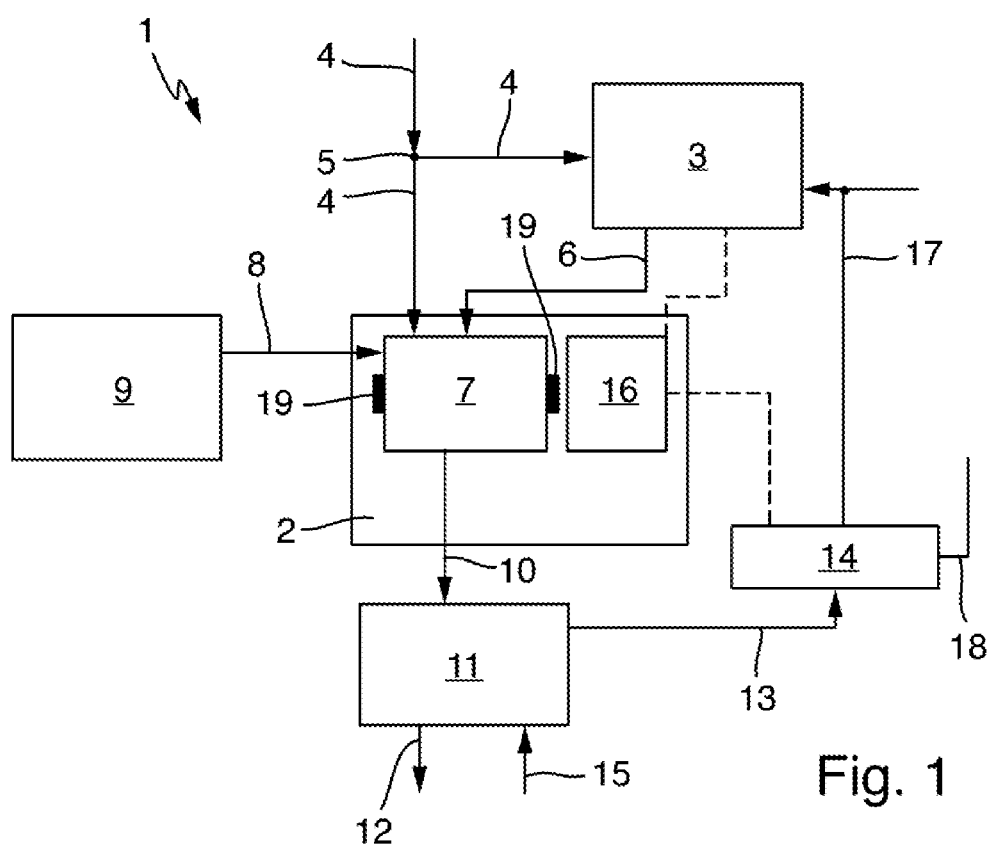
FIG. 1 shows an automatic analysis apparatus for determining a concentration-dependent parameter.

FIG. 1 schematically shows an automatic analysis apparatus 1, as, inter alia, also described in application DE 10 2018 131 060.9, with a measurement unit 2 and a dilution unit 3, upstream of the measurement unit 2, for diluting a sample liquid taken from a sampling point via the sample line 4. Further details regarding individual components of the analysis apparatus can be taken from the aforementioned application.

Optionally, the sample line 4 can have a branch 5, with which the sample taken can be transferred via a second sample line into the dilution unit 3. The dilution unit 3 is only optional and can also advantageously be saved when carrying out the method according to the present disclosure, since a pre-dilution is now no longer absolutely necessary.

The dilution unit 3 is connected via a further liquid line 6 with the measurement unit 2, which serves to supply diluted sample liquid to the measurement unit 2.

The sampling point may be, for example, an open body of water, a basin of a water treatment or clarification plant, or a process container of a process engineering process. The measurement unit 2 serves to determine values of a parameter that depends on the concentration of at least one analyte contained in the sample liquid. The parameter may, for example, be a concentration of a single analyte, for example an ion type, an organic substance or another dissolved substance. The parameter may also be a sum parameter to the value of which a plurality of analytes contributes, for example the spectral absorption coefficient SAC, total nitrogen content TN, chemical oxygen demand CSB or COD, or total carbon content (TC).

In the present example, the sample liquid is a water-based solution or mixture (for example, suspension, dispersion and/or emulsion, solution). However, the device described herein and the method described further below can also be used for dilution and analysis of sample liquids based on solvents other than water.

In the present example, the measurement unit 2 comprises a measuring cell 7 which is fluidically connected with the sample line 4, with the liquid line 6 coming from the dilution unit 3, and with a further liquid line 8. The further liquid line 8 connects a storage container 9 with the measuring cell 7. The storage container 9 contains a reagent which is intended to be mixed with the diluted sample liquid to form a reaction mixture. The reagent undergoes a chemical reaction with the analyte, which reaction leads to the formation of a reaction product, in particular a colored reaction product, which can be detected with optical means. In one variant, the measurement unit 2 can be designed to produce the reaction mixture directly in the measuring cell 7. Alternatively, the measurement unit 2 may have a mixing device, upstream of the measuring cell 7, for producing the reaction mixture (not shown here).

In the exemplary embodiment described here, the measuring cell 7 has an optical measuring transducer 19, for example a photometer or a spectrophotometer, which serves to detect measured values representing the parameter to be determined. For example, the measuring transducer 19 may have one or more radiation sources, for example one or more LEDs, as well as one or more radiation receivers, for example one or more photodiodes, a photodiode panel or a CCD panel. The radiation source(s) and radiation receivers are arranged opposite one another in such a way that measuring radiation emitted by the radiation source(s) passes through the reaction mixture received in the measuring cell and subsequently strikes the radiation receiver(s). The radiation receiver is designed to output measurement signals which are dependent on the intensity of the received radiation and which represent an absorption or extinction of the measuring radiation in the reaction mixture.

The measuring cell 7 moreover has a liquid outlet 10 which opens into an optional collection container 11 for a waste liquid mixture. All or individual liquids conducted through the measuring cell 7 may be discharged into this collection container 11. The collection container 11 has a discharge line 12 via which the waste liquid mixture can be removed from time to time in order to supply it to a disposal. The collection container 11 is moreover connected via a fluid line 13 with a separating device 14 that is also optional.

The separating device 14 is fluidically connected with the dilution unit 3 via a further liquid line 17. The condensate collected in the condensate container of the separating device 14 may serve as dilution liquid for sample liquid taken from the sampling point and may be supplied to the dilution unit 3 via the liquid line 17. The dilution unit 3 has a storage container (not shown in more detail in FIG. 1) for the dilution liquid, into which storage container the condensate is first introduced via the liquid line 17. The dilution is carried out completely automatically by the dilution unit 3. For this purpose, it has means for metering and mixing the sample liquid and the dilution liquid, for example liquid lines and one or more pumps and valves, with which sample liquid and dilution liquid are taken from the sampling point and the storage container for dilution liquid as required and are mixed in a predetermined mixing ratio. For mixing, the dilution unit may comprise a mixing container, for example a container with a stirrer, or a liquid line with a corresponding shape or structuring, which lead to the swirling of the two liquids to be mixed. At least a portion of the diluted liquid sample thus produced may be supplied to the measurement unit 2 via the liquid line 6.

The analysis apparatus 1 may also be designed to supply the dilution liquid, optionally or at fixed time intervals, from the dilution unit 3 to the measuring cell 7 without the addition of sample liquid. This allows the implementation of zero measurements, i.e., the detection by means of the measurement unit 2 of a measured value, which represents a zero point of the analysis apparatus 1. Such a zero measurement may be used to calibrate and/or adjust the analysis apparatus 1.

The analysis apparatus has suitable controllable means, for example pumps and valves, for transporting and metering liquids. In order to fully automatically perform the dilution of the sample liquid and the detection of measured values of the measurement variable, the measurement unit in the present example moreover has a measuring and control electronics 16. The latter is connected with the measuring cell 7, in particular with the measuring transducer 19 of the measuring cell 7, in order to detect and process its measurement signals. For this purpose, the measuring and control electronics 16 has a memory with a measurement program stored therein and is designed to execute the measurement program in order to derive measured values of the parameter from the measurement signals and output them.

In addition, the measuring and control electronics 16 may be connected with the separating device 14, the dilution unit 3 and the measuring cell 7, as well as with the pumps and valves of the automatic analysis apparatus 1 which serve to transport and meter liquids. An operating program for controlling the analysis apparatus 1 is stored in the memory of such measuring and control electronics 16 and such measuring and control electronics 16 is designed to execute the operating program in order to control the pumps and valves of the analysis apparatus 1, and to meter and transport liquids according to the operating program, and to completely automatically carry out the recovery of the dilution liquid from the waste liquid mixture contained in the collection container 11, and the dilution of the sample liquid with the dilution liquid. Part of the electronics controlling the dilution of the sample liquid may be stored in the dilution unit 3 as on-site electronics.

The above-described reprocessing of the dilution liquid is to be understood merely as an optional design, which can be combined with the method according to the present disclosure.

The method according to the present disclosure can also be operated without a dilution unit, a separating device and the corresponding fluid lines. In a simplified embodiment variant, in addition to the measuring cell and the optical measuring transducer, the analysis apparatus can thus be provided merely as a storage tank for the reagent and the dilution liquid and a collection container for the liquid discharged from the measuring cell.

In enhancing DE 10 2018 131 060.9, the present disclosure in this case assumes that, in the first measurement of a sample liquid, the current value of the parameter to be measured is outside the measuring range of the optical measuring transducer used in spite of the dilution carried out or even without any dilution carried out.

If the concentration of the sample liquid is outside the measuring range of the optical measuring transducer, an accurate determination of the absorption or transmission by the optical measuring transducer is not possible and the sample liquid has to be discarded.

In order to solve this problem, a further dilution can take place according to the present disclosure within the measuring cell until the sample liquid is diluted to such an extent that the measurement is within the measuring range of the optical measuring transducer.

The measuring cell 7 can be specially designed for this purpose. Examples of embodiment variants according to the present disclosure can be found in FIGS. 2, 3 and 4.

Figure 2:
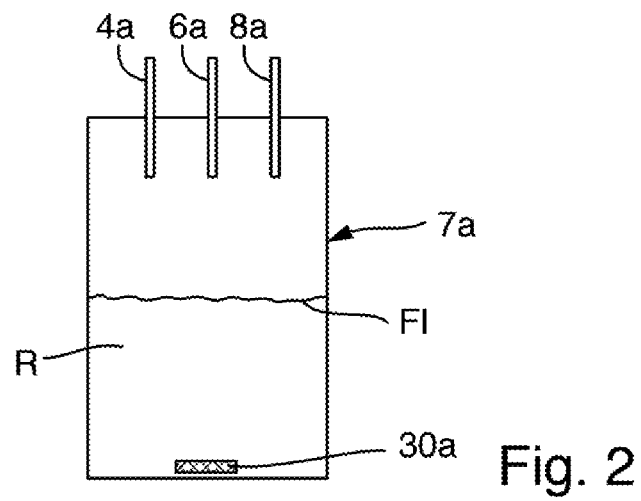
FIG. 2 shows a schematic representation of a first measuring cell for integration into an analysis apparatus according to FIG. 1.

FIG. 2 shows a first embodiment variant of a measuring cell 7a of an analysis apparatus according to the present disclosure with an enlarged capacity. The normal liquid level within the measuring cell 7a may be, for example, 50%, or even significantly less than 50%, of the capacity of the measuring cell 7a. If there is now a message that the concentration of the sample liquid is outside the measuring range of the optical measuring transducer, the liquid level FL of the reaction mixture R within the measuring cell 7a is further increased.

In the variant of FIG. 2, a compensating volume must be provided within the measuring cells 7a and is required for the additional dilution for adaptation to the measuring range. A corresponding installation space must be kept available in the analysis apparatus.

Analogously to the measuring cell 7 of FIG. 1, the measuring cell 7a has a supply line 4a, 6a and 8a for a sample, a reagent and a dilution, respectively. Of course, only one supply line may also be provided with corresponding regulation by a control valve.

A stirring element 30a of a stirring device, for example a magnetic stirrer with a stirring magnet, can be provided for the homogenization of the measuring-range-optimized dilution.

Figure 3:
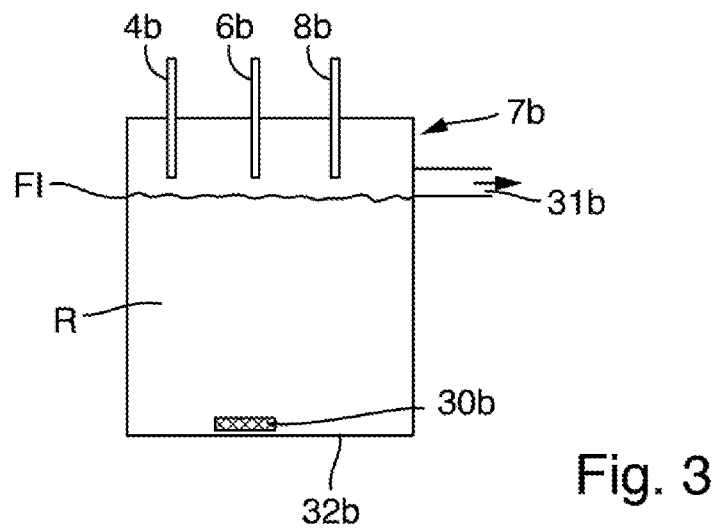
FIG. 3 shows a schematic representation of a second measuring cell for integration into an analysis apparatus according to FIG. 1.

FIG. 3 shows a second embodiment variant of a measuring cell 7b of an analysis apparatus according to the present disclosure. In this variant, an open drain 31b for limiting the liquid level in the measuring cell 7b is provided. The feeds 4b, 6b and 8b for the sample liquid, the dilution and the reagent, in particular the feed 6b of the dilution, are shown only schematically here. In particular, the feed of dilution 6b can open into the solution near the stirring device 30.

The distance between a bottom 32b of the measuring cell 7b and the drain 31b in this case determines the liquid level within the measuring cell. A stirring element 30b of a stirring device 30b homogenizes the solution.

Figure 4:
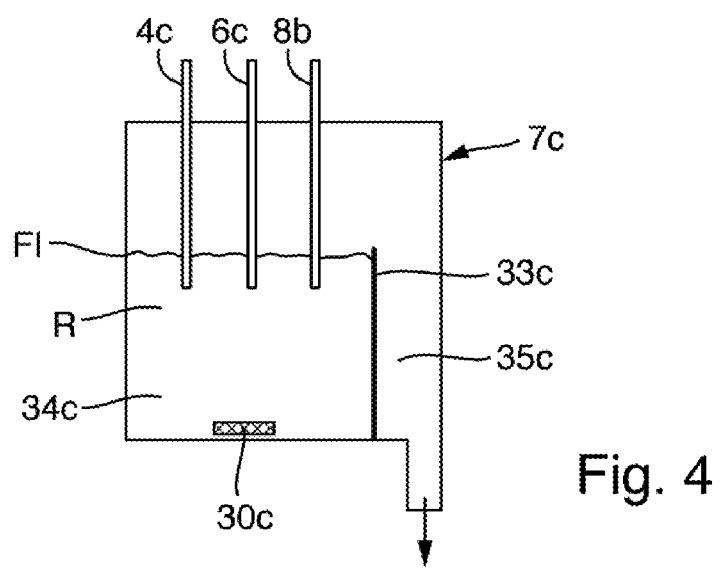
FIG. 4 shows a schematic representation of a third measuring cell for integration into an analysis apparatus according to FIG. 1.

FIG. 4 shows a third embodiment variant of a measuring cell 7c.

Here, an overflow weir 33c is formed within the measuring cell 7c. A receptacle 34 for receiving diluted sample solution is located on one side of the overflow weir. A drainage shaft 35c, in which overflowing sample solution can drain, is located beyond the receptacle 34c. A stirring device 30c for homogenizing the sample solution is also provided in the variant of FIG. 4.

An example of a method for determining the parameter of the sample liquid by means of the automatic analysis apparatus 1 is described below. All steps are carried out in an automatically controlled manner by the measuring and control electronics 16.

In a first step, sample liquid is taken from the sampling point via the sample supply line 4 and is flushed into the measuring cell 7 via the liquid outlet 10 into the collection container 11. There, the sample liquid forms a waste liquid mixture with liquid already present in the collection container from earlier measurement cycles.

In a second step, the extinction or absorption of measuring radiation in the reaction mixture is detected in the measuring cell by means of the photometric or spectrometric measuring transducer, and a value of the parameter is determined on the basis of the measurement signal of the radiation detector, which measurement signal is a measure of the concentration of the reaction product in the reaction mixture.

For example, this may take place using a calibration table or calibration function stored in a memory of the measuring and control electronics 16, taking into account the dilution factor with which the sample liquid was diluted. The calibration table or calibration function associates measurement signal values with values of the measurement variable.

In a third step, the consumed reaction mixture is discharged from the measuring cell 7 into the collection container 11.

The described method may be repeated cyclically multiple times.

However, if the concentration of the sample solution is outside the measuring range of the measuring transducer, the aforementioned method has to be modified. In this case, however, the optical density of the sample solution can be determined as the second measurement variable. The current concentration of the sample solution can be estimated on the basis of the optical density, and a dilution ratio optimized for the measuring range can thereby be adjusted. For this purpose, dilution solution is passed through the supply line for dilution directly into the measuring cell. The excess volume can either be accommodated in the measuring cell (variant of FIG. 2) or, in the case of a constant liquid level, can be discharged from the measuring cell (variant of FIG. 3 or FIG. 4). By additional dilution of the sample solution within the measuring cell 7, a dilution optimized for the measuring range can take place so that the sample solution does not have to be discarded.

Alternatively to determining the second measurement variable, a defined volume of dilution solution can also be added to the reaction mixture R until the determined first measurement variable of the measuring transducer is within its measuring range.

Both variants of the method according to the present disclosure reduce the measuring outlay, the measuring time and the volume of waste solution produced The present disclosure is not limited to the aforementioned exemplary embodiment. In principle, it is thus possible to adapt any sample solution which is located in a measuring cell and is outside the measuring range by determining a second measurement variable and sub sequent dilution.

Although the second measurement variable does not allow an exact concentration determination of the concentration of the analyte, it is sufficiently accurate for adjusting the concentration to a suitable measuring range.

Alternatively, instead of detecting a second measurement variable, iterative metering can also take place with repeated detection of the first measurement variable. In this case, a predetermined volume of dilution liquid is fed into the sample solution of the measuring cell until the detection of the first measurement variable reveals that the detected measurement variable is within the measuring range of the optical measuring transducer.

Preferably, and not shown in FIGS. 2-4, the feed of dilution solution or the drain from the measuring cell 7a-7c comprises a measuring device for determining the volume supplied. This can be, for example, a magnetically inductive flowmeter, an impeller counter or the like. It is also possible to select a uniform metered volume, for example by means of an upstream metering container.

The dilution of the sample liquid after the detection of the first measurement variable within the measuring cell, preferably the measuring cuvette, results in a time saving and a reduced consumption of dilution liquid.

A multitude of further variants and exemplary embodiments of the present disclosure are conceivable.

The advantages of the method according to the present disclosure and of the analysis apparatus according to the present disclosure are that, on the one hand, the measuring range end can be increased, without simultaneously increasing the measuring range beginning, and consequently the measurement ratio.

Furthermore, the concentration in the method according to the present disclosure and when using the analysis apparatus according to the present disclosure need not be approximately known in order to determine the specific dilution ratio. This knowledge of the approximate concentration range can advantageously be omitted by determining the second measurement variable or by iterative approximation to the measuring range.

In addition, the consumption of dilution liquid is minimized in this type of application.

Since the dilution takes place in the measuring cell or in a measuring cuvette, no additional vessels and apparatuses are necessary for the dilution. It is thus also possible for the dilution unit 3 of FIG. 1 to advantageously be omitted, which represents an apparatus simplification of the analysis apparatus.

The invention claimed is:

1. A method of operating an automatic analysis apparatus for determining a parameter of a sample liquid, which depends on a concentration of at least one analyte in the sample liquid, based on a first measurement variable detected by the automatic analysis apparatus, wherein the automatic analysis apparatus comprises a measurement unit including an optical measuring transducer, the method comprising:
   providing a reaction mixture comprising the sample liquid in the measurement unit;
   detecting a first measured value of the first measurement variable using the optical measuring transducer, wherein the first measurement variable is at least one of an extinction, transmission, and intensity of light transmitted through the reaction mixture;
   when the detected first measured value indicates that the concentration of the at least one analyte in the reaction mixture is outside a measuring range of the automatic analysis apparatus for accurately detecting the first measurement variable, detecting a measured value of a second measurement variable of the reaction mixture using the optical measuring transducer, wherein the second measurement variable is an optical density of the reaction mixture, wherein the second measurement variable is different than the first measurement variable, and wherein the detecting of the second measurement variable has a greater measuring uncertainty than the first measurement variable;
   subsequently diluting the provided reaction mixture with a dilution liquid as a function of the detected measured value of the second measurement variable; and
   subsequently detecting a second measured value of the first measurement variable; and
   determining the parameter in the sample liquid based on the detected second measured value of the diluted reaction mixture via a measuring and control electronics of the automatic analysis apparatus such that the parameter is determined with greater accuracy than when based on the first measured value.

2. The method of claim 1, wherein the optical measuring transducer is a photometer or a spectrophotometer.

3. The method of claim 1, wherein the automatic analysis apparatus includes a dilution unit, wherein determining the second measurement variable is performed using the optical measuring transducer, wherein the dilution is performed using the dilution unit, wherein the measuring and control electronics is configured to determine a dilution factor as a function of the detected measured value of the second measurement variables and the dilution of the sample liquid is performed by metering using the dilution unit, wherein the dilution unit is controlled by the measuring and control electronics as a function of the dilution factor.

4. The method of claim 1, wherein a volume of the dilution liquid supplied to dilute the reaction mixture is determined by a measurement using a measuring device or by specifying a defined metered volume.

5. The method of claim 4, wherein the volume of the dilution liquid supplied is taken into account when determining the concentration of the at least one analyte in undiluted sample liquid.

6. The method of claim 1, wherein the automatic analysis apparatus includes an interface with a sampling point, wherein the sample taken from the sampling point corresponds to the sample liquid introduced into the measurement unit.

7. The method of claim 1, further comprising:
  flushing at least the measurement unit of the automatic analysis apparatus with a first volume of the sample liquid;
  discharging the first volume of the sample liquid used to flush the measurement unit into a collection container containing a waste liquid mixture;
  introducing a second volume of the sample liquid into the measurement unit as the provided sample liquid of the reaction mixture;
  producing the reaction mixture from at least a portion of the second volume of the sample liquid and at least one reagent;
  detecting the first or second measured value of the first measurement variable of the reaction mixture in the measurement unit, wherein the first measurement variable correlates with the parameter of the sample liquid that is to be determined; and
  after detecting the first or second measured value of the first measurement variable, discharging the reaction mixture from the measurement unit into the collection container.

8. The method of claim 1, wherein the dilution liquid is essentially free of the at least one analyte.

* * * * *